(12) United States Patent
Ebner et al.

(10) Patent No.: US 7,078,100 B2
(45) Date of Patent: *Jul. 18, 2006

(54) OXYGEN SCAVENGER COMPOSITIONS DERIVED FROM ISOPHTHALIC ACID AND/OR TEREPHTHALIC ACID MONOMER OR DERIVATIVES THEREOF

(75) Inventors: Cynthia L. Ebner, Greer, SC (US); Andrew E. Matthews, Thurlby (GB); Terry O. Millwood, Spartanburg, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/649,703

(22) Filed: Aug. 28, 2003

(65) Prior Publication Data

US 2005/0048285 A1 Mar. 3, 2005

(51) Int. Cl.
*B32B 27/08* (2006.01)
*B32B 9/06* (2006.01)
*B32B 15/08* (2006.01)
*C08K 3/10* (2006.01)
*C08K 5/56* (2006.01)

(52) U.S. Cl. ............... 428/411.1; 428/457; 428/537.5; 252/188.28; 524/176; 524/398; 524/413

(58) Field of Classification Search ............... 428/457, 428/537.5, 411.1; 523/515; 252/188.28; 524/176, 398, 413, 431, 435, 502, 513–514, 524/539, 589, 599, 601, 604, 605, 609
See application file for complete search history.

(56) References Cited

U.S. PATENT DOCUMENTS

| 4,536,409 | A | | 8/1985 | Farrell et al. ............... 426/398 |
|---|---|---|---|---|
| 4,702,966 | A | | 10/1987 | Farrell et al. ............... 428/500 |
| 4,720,356 | A | * | 1/1988 | Chu ............................ 252/586 |
| 5,021,515 | A | | 6/1991 | Cochran et al. ............. 525/371 |
| 5,166,309 | A | | 11/1992 | Maj et al. .................... 528/272 |
| 5,211,875 | A | | 5/1993 | Speer et al. ........... 252/188.28 |
| 5,281,360 | A | | 1/1994 | Hong et al. ............ 252/188.28 |
| 5,399,289 | A | | 3/1995 | Speer et al. ........... 252/188.28 |
| 5,604,043 | A | | 2/1997 | Ahlgren ...................... 428/518 |
| 5,700,554 | A | | 12/1997 | Speer et al. ................. 428/220 |
| 5,859,145 | A | | 1/1999 | Ching et al. ............. 525/330.6 |
| 6,083,585 | A | | 7/2000 | Cahill et al. ............... 428/35.7 |
| 6,187,444 | B1 | * | 2/2001 | Bowles et al. ........... 428/423.1 |
| 6,254,803 | B1 | | 7/2001 | Matthews et al. ...... 252/188.28 |
| 6,254,804 | B1 | | 7/2001 | Matthews et al. ...... 252/188.28 |
| 6,346,308 | B1 | | 2/2002 | Cahill et al. ............... 428/35.7 |
| 6,365,247 | B1 | | 4/2002 | Cahill et al. ............... 428/35.7 |
| 6,544,611 | B1 | | 4/2003 | Schiraldi et al. ........... 428/35.8 |

FOREIGN PATENT DOCUMENTS

| AU | 199656326 | 12/1996 |
|---|---|---|
| DE | 1900181 | 10/1969 |
| EP | 0040983 A1 | 12/1981 |
| EP | 0418011 B1 | 3/1991 |
| WO | WO 99/48963 | 9/1999 |
| WO | WO 02/49923 | 6/2002 |

* cited by examiner

*Primary Examiner*—Michael Miggins
(74) *Attorney, Agent, or Firm*—Howard Troffkin; Mark Quatt

(57) ABSTRACT

An oxygen scavenger composition includes mer units that have at least one cycloalkenyl group or functionality and, further, has mer units derived from isophthalic acid or terephthalic acid or certain derivatives thereof. The oxygen scavenger composition has been found to act as an oxygen scavenger under both ambient and refrigeration conditions, to be compatible with conventional film forming packaging materials, to inhibit undesirable oligomer formation and oxidation by-product formation, and to be readily formable and processable using conventional film forming equipment. A film and laminated product having said oxygen scavenger composition are also disclosed.

14 Claims, No Drawings

OXYGEN SCAVENGER COMPOSITIONS DERIVED FROM ISOPHTHALIC ACID AND/OR TEREPHTHALIC ACID MONOMER OR DERIVATIVES THEREOF

FIELD OF THE INVENTION

The invention relates to an oxygen scavenger composition and packaging material that comprise said composition.

BACKGROUND OF THE INVENTION

Limiting the exposure of oxygen-sensitive materials, e.g. food products, meats, beverages, pharmaceuticals, etc., to oxygen exposure provides a means to maintain and enhance the quality and shelf life of the packaged product. For example, packaging a food product in a package capable of minimizing oxygen exposure is a means to maintain the quality of the packaged product over an extended time and to retard spoilage of the product so that the product is maintained in inventory longer without wastage and the need for restocking and replacement.

When a container is formed of a metal or glass body and is provided with a hermetically sealed closure, the permeation of oxygen through the body and the closure is theoretically impossible because of the impermeability of the materials from which the body and closure are formed. Metal cans may reliably prevent oxygen ingress. However, in both instances some oxygen ingress may occur by diffusion through the gasket or the like positioned between the container body and its lid. When a container is formed of a plastic material, such as a bottle, plastic bag, film, tray or lid, the permeation of oxygen through the body becomes an issue of importance. Further, the quality of the packaged material tends to deteriorate over time, in part because of dissolved oxygen typically present in the packaged material at the time it is placed in the packaging container and also in part due to oxygen ingress which occurs during storage. It has long been recognized that when conventional containers of these types are used for the storage of oxygen sensitive materials, the shelf life of the stored materials is limited.

In the food packaging industry, several techniques have been developed to limit oxygen-sensitive packaged materials to oxygen exposure. Such techniques include the use of a barrier material or layer (a material or layer having low permeability to oxygen) as part of the packaging; the inclusion of some means capable of consuming oxygen other than the packaging material (e.g. through the use of sachets and the like having material capable of reacting with oxygen); and the creation of a reduced oxygen environment within the package (e.g. modified atmosphere packaging (MAP) and vacuum packaging).

Although each of the above techniques has its place in the industry, it is well recognized that the inclusion of an oxygen scavenger as part of a packaging article is one of the most desirable means of limiting oxygen exposure.

It is known to include an oxygen scavenger in a sheet material. The oxygen scavenger reacts with oxygen that is trapped in the package or that permeates into the package. For instance, this is described in U.S. Pat. Nos. 4,536,409 and 4,702,966 and the prior art discussed in these references. The inclusion of oxygen scavengers within the cavity of the package is a form of "active packaging", i.e., the modification of the package to accommodate a means to regulate oxygen exposure. Normally, the modification is in the form of a sachet or the like introduced into the package cavity. Such active packaging devices have the disadvantages of requiring additional packaging operations, potential breakage of the sachet causing contamination of the packaged goods, and uneven or localized scavenging.

Alternately, regulating the exposure to oxygen involves incorporation of an oxygen-scavenging agent directly into the packaging structure itself. For example, oxygen-scavenging agents have been utilized as part of the package element (film, gasket, coating, etc.) rather than by the addition of a separate structure to the package. Such application has been found to provide a more uniform scavenging effect throughout the package and to provide a means of intercepting and scavenging oxygen as it passes through the walls of the package (herein after referred to as "active barrier" application). Incorporation of a scavenger agent are also used to consume oxygen contained in the packaging article either as residual air oxygen in the packaged goods and/or in the void space within the packaging article not occupied by the packaged goods (herein after referred to as "headspace oxygen scavenging" applications). Headspace oxygen scavenging normally entails the removal of large quantities of oxygen from the interior of the package.

Various agents have been proposed as oxygen scavengers. For example, Michael Rooney, in his article "Oxygen Scavenging: A Novel Use of Rubber Photo-Oxidation", Chemistry and Industry, Mar. 20, 1982, Pg. 197–198, describes the use of ethylenically unsaturated compounds as oxygen scavengers when exposed to light.

Attempts to produce active oxygen scavenging barrier products include the incorporation of inorganic powders and/or salts into a polymer matrix used to form packaging. Incorporation of such powders and/or salts has been found to cause degradation of the transparency and mechanical properties (e.g. tear strength) of the packaging material and cause processing difficulties in the fabrication of the packaging material.

Attempts have been made to produce active oxygen scavenging barrier products in which a polyamide-metal catalyst system capable of scavenging oxygen is incorporated into a polymeric packaging material. This polyamide-based system has the disadvantages of incompatibility with thermoplastic polymers normally used in forming flexible packaging materials. In addition, this system imparts reduced flexibility and heat sealability of the resultant packaging material, as well as degradation of the polymer's physical properties and structure upon reaction with oxygen.

U.S. Pat. No. 5,399,289, incorporated herein by reference in its entirety, teaches the use of ethylenically unsaturated hydrocarbon polymers (e.g. polybutadiene and like), and copolymers and polymer blends thereof formed by free radical polymerization. This reference teaches that the unsaturation should be limited to 0.01 to 10 equivalents per 100 grams of polymer as the adsorption of oxygen by such systems causes fission of the polymer backbone chain. Such polymers, when reacting with oxygen, normally degrade to low molecular weight products via chain scission and the resultant oxidation by-products can cause degradation of the taste, color and odor of the packaged material (e.g. food products).

While the prior art compounds may effectively scavenge oxygen, they introduce other problems into packaging. For instance, in summary, the prior art teaches the incorporation of compounds which are ethylenically unsaturated but which often cleave as a consequence of the reactions of the oxygen scavenging process. Unfortunately many of the resultant volatile compounds are not maintained within the film structure and find their way into the headspace of the package. Here they have the potential to degrade the taste, color and/or odor of comestible products.

U.S. Pat. No. 6,254,803 discloses polymers having at least one cyclohexenyl group or functionality as being useful as oxygen scavengers. This reference includes the use of condensation polymers formed from tetrahydrophthalic anhydride, the free acid, and the ester or diester derivatives with a diol or polyol reagent. For example, when the cyclohexenyl containing reactant is a free acid, an anhydride or ester group, the reference teaches that diols, e.g. butanediol, may be used as a co-reactant. Alternatively, the condensation polymer may be formed from a tetrahydrobenzyl alcohol or the corresponding amine or other cyclohexenyl amine which is reacted with compounds having a plurality of functional groups selected from carboxylic acid, acid halide, acid anhydride, isocyano or mixtures thereof. The teachings of U.S. Pat. No. 6,254,803 are incorporated herein in its entirety by reference.

Although polymers formed from tetrahydrophthalic anhydride and the like according to U.S. Pat. No. 6,254,803 do not generate large amounts of oxidation fission products during scavenging, they have been found to contain large amounts of low molecular weight oligomeric materials. The low molecular weight oligomeric materials are believed to be by-products produced during formation of the condensation polymer. Removal of such material would be expensive and difficult to carry out without degradation of the condensation polymer. However, these low molecular weight products tend to migrate out of the packaging material formed with such polymers and into the packaged goods during application causing degradation of the taste, color and/or odor of the packaged goods.

In addition, for those applications that require refrigerated headspace oxygen scavenging, a low $T_g$ is necessary. When this requirement is met, the referenced polymers, in addition to having low $T_g$, exhibit low melting point, high melt flow index, high tack properties and are viscous liquids at ambient temperature conditions. Such polymers are not pelletizable or readily handled, and are difficult to process into films and other packaging articles using conventional processing equipment. They can provide a resultant product that may not be acceptable for packaging applications.

Ideally, a polymeric material useful in an oxygen scavenging composition should exhibit good processing characteristics, be able to be formed into useful packaging materials, have high compatibility with those polymers commonly used to make packaging materials, and not contain or produce by-products which detract from the color, taste, or odor of the packaged product. Further, the resultant oxygen scavenging composition should be active both under ambient and refrigerated temperature conditions for either headspace oxygen scavenging applications or "active barrier" scavenging applications.

The present invention seeks to address the problems associated with the polymers produced according to U.S. Pat. No. 6,254,803, by seeking to provide compositions that 1) act as oxygen scavengers in packaging applications while minimizing the migration of low molecular weight products out of the packaging material containing the compositions and into packaged goods, and/or 2) can be used under both ambient and refrigerated conditions, and/or 3) can be used for refrigerated headspace scavenging applications, and/or 4) when reacted with oxygen, produce very low quantities of scission and oligomeric by-products.

It has now been found that when condensation polymers comprising ethylenic unsaturation as part of a cyclic group therein are formed from certain reactants that include isophthalic isophthalic or terephthalic acid or certain derivatives thereof, as fully described herein below, one can achieve an oxygen scavenger having the desired combination of properties indicated above.

SUMMARY OF THE INVENTION

The present invention is in one aspect directed to an oxygen scavenger composition, to an article made therefrom, and to a process of making the composition or article, where the composition comprises mer units that have at least one cycloalkenyl group or functionality and, further, has mer units derived from isophthalic acid or terephthalic acid or certain derivatives thereof. The oxygen scavenger composition has been found to act as an oxygen scavenger under both ambient and refrigeration conditions, to be compatible with conventional film forming packaging materials, to inhibit undesirable oligomer formation and oxidation by-product formation, and to be readily formable and processable using conventional film forming equipment.

The present invention is in a second aspect directed to a film wherein at least one layer of the film comprises an oxygen scavenger composition comprising mer units having cycloalkenyl group(s) or functionality, in combination with certain other defined mer units, as fully described herein below.

The present invention is in a third aspect directed to a laminated product having a plurality of layers wherein at least one layer of the laminated product comprises an oxygen scavenger composition comprising mer units having cycloalkenyl group(s) or functionality, in combination with certain other defined mer units, as fully described herein below.

The film or laminated product of the invention can further comprise a diluent polymer having substantially uniformly distributed therein the subject oxygen scavenger composition.

DETAILED DESCRIPTION OF THE INVENTION

The oxygen scavenger composition of the present invention can be incorporated in packaging articles having various forms.

Suitable articles include, but are not limited to, flexible sheet films, flexible bags, pouches, semi-rigid and rigid containers such as bottles (e.g. PET bottles) or metal cans, or combinations thereof.

Typical flexible films and bags include those used to package various food items and may be made up of one or a multiplicity of layers to form the overall film or bag-like packaging material. The oxygen scavenger composition of the present invention can be used in one, some or all of the layers of such packaging material.

Typical rigid or semi-rigid articles include plastic, paper or cardboard containers, such as those utilized for juices, soft drinks, as well as thermoformed trays or cup normally having thickness in the range of from 100 to 1000 micrometers. The walls of such articles can comprise single or multiple layers of materials. The articles can also take the form of a bottle or metal can, or a crown, cap, crown or cap liner, plastisol or gasket. The oxygen scavenger composition of the present invention can be used as an integral layer or portion of, or as an external or internal coating or liner of, the formed semi-rigid or rigid packaging article. As a liner, the oxygen scavenger composition can be extruded as a film along with the rigid article itself, in e.g. a coextrusion, extrusion coating, or extrusion lamination process, so as to form the liner in situ during article production; or alternatively can be adhered by heat and/or pressure, by adhesive, or by any other suitable method to an outer surface of the article after the article has been produced.

Although it may be preferable from the standpoint of packaging convenience and/or scavenging effectiveness to employ the present invention as an integral or discrete part of the packaging wall, the invention can also be used as a non-integral component of a packaging article such as, for example, a bottle cap liner, adhesive or non-adhesive sheet insert, sealant, sachet, fibrous mat insert or the like.

Besides articles applicable for packaging food and beverage, articles for packaging other oxygen-sensitive products can also benefit from the present invention. Such products would include pharmaceuticals, oxygen sensitive medical products, corrodible metals or products, electronic devices and the like.

The oxygen scavenger composition of the invention can also be used in non-integral packaging components such as coatings, sachets, bottle cap liners, adhesive and non adhesive sheet inserts, lamination adhesive, coupons, gaskets, sealants or fibrous mat inserts. Although it has been previously reported (See U.S. Pat. No. 6,254,803) that materials containing certain cyclohexenyl functionality are good oxygen absorbers when compounded with a transition metal salt and, optionally, a photoinitiator, the use of such materials, especially polymeric materials containing said cyclohexenyl functionality has been limited due to the fact that, when prepared in the manner previously described, they generate oligomeric by-products and are viscous liquids at ambient temperature conditions.

It has now been found that condensation polymers having cycloalkenyl functionality can be formed in combination with certain other monomeric components to provide a product that contains reduced levels and/or inhibits the formation and extraction from packaging material of oligomeric by-products. Further, the polymer product of the present invention has been found capable of exhibiting low $T_g$, yet is a non-tacky, solid substance at ambient temperature conditions. The present polymers are capable of being readily processed into sheet and other forms suitable for packaging applications by conventional techniques. Further, the resultant materials have good handling properties and are capable of effectively scavenging oxygen under both ambient (20° C. to 30° C.) and refrigeration (less than 20° C. to minus 20° C., such as from 10° C. to minus 15° C., 5° C. to minus 10° C. and 5° C. to minus 5° C.) conditions.

The following terms have the following meaning when used in the present specification and appended claims unless a contrary intention is expressly indicated:

"aromatic" means organic molecules and groups having at least one six carbon ring of the benzene and related series or the condensed six carbon rings of naphthalene and related series; said groups may be referred to as aryl, alkaryl or aralkyl groups and the like.

"condensation polymer" means a polymerization product formed by the union of like or unlike molecules which are covalently bonded by a reaction of groups on each molecule with the elimination of water, acid, alcohol or the like, such as the reaction of a hydroxyl group with a carboxylic acid group, an amine group with a carboxylic acid group, a carboxylic acid anhydride group with a hydroxyl group and the like.

"functional group" means alcohol, carboxylic acid anhydride, carboxylic acid ester, carboxylic acid, halogen, primary, secondary, or tertiary amine, aldehyde, ketone, hydroxyl or sulfonyl group.

"film" means an article suitable for a packaging application or suitable as a component of an article useful for a packaging application, wherein the article or component comprises a flexible article having extended length and width dimensions and a thickness of from 5 to 260 micrometers comprising at least one layer, wherein at least one layer comprises the oxygen scavenger composition of the present invention.

"head-space" means a void or space within the volume of a package container that is not occupied by the solid or liquid packaged goods. Such space is normally filled with air or other gaseous material.

"hydrocarbyl" means a univalent or divalent organic group composed of hydrogen and carbon, preferably containing 1 to 40 carbon atoms.

"laminated product" means an article suitable for packaging applications or suitable for forming an article useful for packaging applications wherein the article comprises a plurality of layers, including at least one layer comprising the oxygen scavenger composition of the present invention and including at least one additional layer or portion comprising a flexible, semi-rigid or rigid material, such as, for example, a polymeric film, a polymeric structure, a paper film or structure, a cardboard film or structure, a metal film or structure or the like.

"packaging material" means a flexible film, laminated product, semi-rigid and rigid article, non-integral component, etc. that are suitable for use as part of a packaging article as enumerated herein.

or non-integral component suitable for use as part of a packaging article.

"polyester" means a polymerization product having two or more distinct monomeric units which are covalently bonded by the reaction of a hydroxyl group of one unit with a carboxyl group (free carboxylic acid, the anhydride or a hydrocarbyl ester) of another unit.

"polymer" means a polymerization product composed of a multiplicity of monomeric units (also referred to as "mer units"). The polymer may be a homopolymer composed of a plurality of like monomeric units or a copolymer composed of a plurality of two or more distinct monomeric units.

The present invention is directed to a condensation polymer having mer units derived from a condensation reaction of:

(A) at least one or a mixture of substituted alicyclic compounds having non-aromatic, ethylenic functionality according to the following representation:

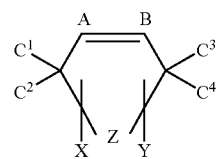

wherein

A, B, $C^1$, $C^2$, $C^3$, $C^4$ each independently represents hydrogen or a $C_qH_{2q+1}$ hydrocarbyl group with q being an integer in the range of from 0 to 20, provided that either A or B and at least one of $C^1$, $C^2$, $C^3$, $C^4$ are hydrogen atoms and each carbon atom of the alicyclic ring is fully substituted by hydrogen, hydrocarbyl, X and/or Y group(s) or mixtures thereof to fill its valence state;

X and Y each independently represents —$(CH_2)_n$—C(=O)-D with n being an integer in the range from 0 to 20 and D being selected from a halide atom or an OR group wherein R is hydrogen atom or a $C_1$–$C_{12}$ alkyl group, or X and Y together represent —$(CH_2)_n$—$(C=O)_x$-D with x being 2, n being an integer in the range from 0 to 20 and D is oxygen atom; and Z representing a —$(C_tH_{2t})$-hydrocarbylene group with t being an integer in the range from 1–4;

(B) at least one or a mixture of difunctional hydrocarbon compounds according to the following representation:

G-R'-G wherein

R' represents a $C_2$ or greater (e.g. $C_2$–$C_{20}$) aromatic or non-aromatic hydrocarbon group selected from alkylene (such as $C_6$–$C_{10}$ alkylene), cycloalkylene or arylene group; said group may contain heteroatoms which are substantially inert with respect to the condensation polymerization and the oxygen scavenging functionality of the composition. Higher, $C_{10}$–$C_{20}$ hydrocarbon R' groups are beneficial when the resultant polymer is contemplated for use as an adhesive layer or the like; and each G represents a hydroxyl or an amino functional group;

(C) at least one or a mixture of polyfunctional hydrocarbon compounds according to the following representation:

J-R''(-J)$_z$ wherein

R'' represents a $C_2$–$C_{20}$ hydrocarbon group selected from alkylene, cycloalkylene, arylene, alkarylene or aralkylene groups or mixtures thereof, such as $C_4$–$C_{12}$ hydrocarbylene, $C_6$–$C_8$ alkylene, $C_6$–$C_{12}$ arylene, or $C_6$–$C_{12}$ alkarylene or aralkylene group; said groups may contain heteroatoms which are substantially inert with respect to the condensation polymerization and the oxygen scavenging; and each J represents a functional group capable of being part of a heteroatom containing linkage between the hydrocarbyl group R'' and at least one other class of monomers forming the condensation polymer, each said J group being independently selected from hydroxyl(—OH), primary amino (—$NH_2$), isocyano (—N=C=O) and —$(CH_2)_n$—C(=O)-D with n being an integer in the range from 0 to 20 and D being selected from a halide atom or an OR''' group, wherein R''' is an —H, or $C_1$–$C_{12}$ alkyl group, or two J groups of a monomer together is —$(CH_2)_n$—$(C=O)_x$-D with n being an integer in the range from 0 to 20 and D is oxygen atom with x being 2; where at least two J groups in one embodiment can be the same functional group or an anhydride group); and z is an integer of from 2 to 5 such as 2–3; and (D) at least one or a mixture of monomer compounds selected from isophthalic acid, terephthalic acid, tetrahydroisophthalic acid, tetrahydroterephthalic acid, hydrogenated isophthalic acid, hydrogenated terephthalic acid, acid anhydride derivatives thereof, $C_1$–$C_{12}$ (preferably $C_1$–$C_3$) alkyl esters thereof, such as dimethyl terephthalate, lower glycol esterified derivatives thereof [e.g. bis(2-hydroxyethyl) terephthalate and the like] and hydrocarbyl derivatives thereof. The preferred compounds are isophthalic acid, terephthalic acid, their $C_1$–$C_3$ esters, and bis(2-hydroxyethyl) terephthalate.

The term "hydrocarbon", as used to describe the R, R', R'' and R''' groups of the above monomers, has a predominantly hydrocarbon character within the context of the present invention. The term "moiety" and "group" are used herein interchangeably.

Such moieties include:

(1) Hydrocarbon groups; that is, aliphatic groups, aromatic groups or alicyclic groups, and the like, of the type known to those skilled in the art.

(2) Substituted hydrocarbon groups; that is, groups containing pendent non-hydrocarbon substituents, that in the context of this invention, do not alter the predominantly hydrocarbon character of the group or interfere with the condensation polymerization and the oxygen scavenging properties of the resultant scavenger material in the contemplated application. Those skilled in the art will be aware of suitable substituents; examples are halo, nitro, silyl, siloxy, alkoxy, carbalkoxy, and alkylthio.

(3) Hetero groups; that is, groups which, while predominantly hydrocarbon in character within the context of this invention, contain atoms other than carbon present as a member of the linear structure of a chain or ring otherwise composed of carbon atoms. Suitable heteroatoms will be apparent to those skilled in the art and include, for example, nitrogen, oxygen, silicon and sulfur.

The hydrocarbon based group can be substituted or unsubstituted, cyclic or non-cyclic, linear or branched, aliphatic, or aromatic.

The G and J functional groups of their respective monomers can have the G or J group bonded to the appropriate group R' or R'' at any position. For example, each functional group may be terminally bonded to the R group or R' group or may be bonded to an internal carbon atom of the group.

Examples of monomer (A) include but are not limited to 1,2,3,6-tetrahydrophthalic acid; cis-1,2,3,6-tetrahydrophthalic anhydride; 3,4,5,6-tetrahydrophthalic anhydride; dimethyl-cis-1,2,3,6-tetrahydrophthalate; cyclohexene-4,5-diacetic acid; 1,2,3,6-tetrahydrophthalic acid, dimethyl ester; 1-cyclopentene-1,2-dicarboxylic anhydride; 4-cyclohexene-1,2-diacetic acid; 3-cyclohexene-1,2-diacetic acid; 3-methyl-4-cyclohexene-1,2-diacetic acid; cis-dimethyl-3-cyclohexene-1,2-diacetate; a tetrahydrophthalic anhydride derived from a butadiene, 2,3-dimethyl-1,3-butadiene or isoprene; ($C_1$–$C_3$) alkyl esters, and hydrocarbyl substituted derivatives thereof and mixtures thereof; and the like.

Examples of monomer (B) include but are not limited to:

(1) aliphatic diols as, for example, ethylene glycol; propanediol; pentanediol (all isomers); $C_6$–$C_8$ alkanediol such as hexanediol (all isomers) such as 1,6-hexanediol, heptanediol (all isomers), and octanediol (all isomers); octanediol (all isomers); as well as 1,10-decanediol; 1,14-tetradecanediol, and the like.

(2) cycloaliphatic diols as, for example, 1,4-cyclohexanediol; 1,4-cyclohexanedimethanol; 3-cyclohexene-1,1-dimethanol; and the like; aromatic diols as, for example 1,3-benzenediol; 1,3-naphthanediol and the like;

(3) diamines, such as phenylenediamine; butylenediamine; hexamethylenediamine and the like; or (4) mixtures of the above materials.

Examples of monomer (C) include but are not limited to:

(1) polyols as, for example, 1,2,3-propanetriol, sorbitol, 1,3,5-pentanetriol, 1,5,8-heptanetriol, trimethylolpropane, pentaerythritol, neopentyl glycol, and the like;

(2) aliphatic or aromatic polycarboxylic acids or anhydrides, such as benzenepentacarboxylic acid, benzenehexacarboxylic acid, trimellitic anhydride, pyromellitic dianhydride, benzophenone tetracarboxylic dianhydride, and the like;

(3) polyamines such as 1,2,3-propanetriamine, 1,3,5-pentanetriamine, 1,5,8-heptanetriamine, diethylenetriamine, triethylenetetraamine, 1,2,3-benzenetriamine and the like; and (4) mixtures thereof.

Monomer (C) can have functional groups selected from free carboxylic acid groups, its $C_1$–$C_3$ esters or anhydride derivative, or an isocyano group as, for example, benzenepentacarboxylic acid, benzenehexacarboxylic acid, trimellitic anhydride, pyromellitic anhydride, and the like and mixtures thereof, or from hydroxyl or amino groups as, for example, trimethylolpropane, pentaerythritol and the like and mixtures thereof.

Monomer (C) can be used in amounts of from 300 to 15,000 parts per million (ppm) based on the total monomer content of the condensation polymer.

Monomer (D) can be used in amounts of from 1 to 20 mole percent of the total monomer content of the condensation polymer.

The X and Y groups of the monomer (A), the G group of the monomer (B), the J group of the monomer (C), and the functional groups of monomer (D) are selected from hydroxyl groups, isocyano groups, primary amino groups, carboxylic acid groups (as free acid or anhydride), carboxylic acid ester groups, acid halide groups, or mixtures thereof, as described above, in amounts so as to provide a molar ratio of (i) carboxylic acid, acid ester, and acid halide groups and isocyano groups to (ii) hydroxyl and amine groups of about 1:1 with from 0.9:1 to 1.1:1, such as from 0.95:1 to 1.05:1, to form a condensation polymer having heteroatom containing linking groups (e.g. polyester linkages, polyamide linkages) between residual monomeric units of (A), (B), (C) and (D).

The monomer (A) can be initially mixed with monomer (D) selected, for example, from isophthalic acid, terephthalic acid or ($C_1$–$C_3$) alkyl ester or hydrocarbyl substituted derivatives thereof and mixtures thereof. The molar ratio of (A) to (D) can be from 98:2 to 75:25, such as from 95:5 to 80:20, as, for example, from 93:7 to 85:15 and from 90:10 to 87:13. The exact amount of each monomer will depend on the particular monomers used and the end use desired for the prepared polymer.

Thus, the resultant polymer can be composed of from 40 to 60 (such as 45 to 50) molar percent of monomer (A); from 40 to 60 (such as 45 to 50) molar percent of monomer (B); from 300 to 1500 ppm of monomer (C); and from 1 to 20 (such as 2 to 10) molar percent of monomer (D).

It has been found that the presence of small amounts of monomer (D) described herein above, especially terephthalic acid or isophthalic acid, or the esters thereof, when used as a monomer reactant provides an oxygen scavenging polymer product with substantially reduced levels of undesired low molecular weight oligomer product. The resultant polymer products are more readily useful in food packaging applications and comply with regulatory requirements applicable for such applications.

It has been found that when the polymer product of the present invention is prepared using the monomer reactants described above, one obtains a polymer product capable of inhibiting oligomeric by-product formation. Further, the resultant polymer products are capable of exhibiting low $T_g$, yet are a non-tacky solid substance at ambient temperature conditions. The resultant polymers are capable of being readily processed into sheets and other forms suitable for packaging applications by conventional techniques. Further, the resultant materials have good handling properties and are capable of effectively scavenging oxygen under ambient and refrigeration conditions both for barrier and headspace scavenging applications.

The process for forming the desired condensation polymer product utilizes two distinct process steps. The first step of the process comprises contacting monomers (A), (B), (C) and (D) with each other, neat, at a temperature of at least 115° C. (such as at temperatures of from 120° C. to 250° C., and from 160° C. to 230° C.) with the elimination of water or other condensation by-products.

Upon completion of the first step, the resultant mixture is subjected to a temperature of from 190° C. to 300° C., such as from 200° C. to 260° C. under reduced atmospheric pressure such as less than 1 mm Hg. The mixture is maintained under these conditions for a period of time from at least 30 minutes to over 12 hours until such time as the molecular weight of the polymer ceases to increase.

The second step of the process should be conducted in the presence of a transesterification catalyst, such as a catalytic amount of an acid (e.g., $H_2SO_4$, dry HCl, p-toluenesulfonic acid, or methansulfonic acid) or a base (e.g., alkoxides, oxides, acetates, formates or hydrides) of metals (Li, Na, K, Ca, Be, Mg, Zn, Cd, Sr, Al, Pb, Cr, Mo, Mn, Fe, Cu, Ge, Ti, Ni, Co, Ag, Hg, Sn, Pt, Bo, Sb, Bi, Pd, or Ce). For example, it has been found that a catalytic amount, i.e., 100 to 2000 ppm, of a titanium alkoxide, such as, for example, titanium (IV) butoxide, titanium (IV) isopropoxide, titanium (IV) 2-ethylhexoxide and the like function well.

It has been found that the polymer compositions of the present invention produce significantly less oligomer products and low molecular weight oxidative by-products caused by the oxygen scavenging process than those described in the prior art. They do not require the use of high levels of additives, e.g. zeolites and silicas, to absorb these undesirable materials. Such additives can adversely affect the haze and clarity of packaging structures.

The oxygen scavenger composition of the present invention can be used in one, some or all of the layers of packaging material. The composition can be used as the sole polymeric material from which one or more layers of the packaging material are formed (e.g. a film can be a multilayer film having, for example, a gas barrier layer, a sealant layer, etc.), it can be blended with other polymeric oxygen scavenging agents (such as polybutadiene, poly(ethylene/vinyl cyclohexene) or poly(ethylenemethylacrylate/cyclohexenylmethylacrylate copolymer (EMCM), or it can be blended with one or more diluent polymers which are known to be useful in the formation of films, laminated products, or articles and which often can render the resultant material more flexible and/or processable. Suitable diluent polymers include, but are not limited to:

(1) ethylene polymer and copolymer such as, for example, low-density polyethylene, very low-density polyethylene, ultra-low density polyethylene, high-density polyethylene, linear low density polyethylene, ethylene/vinyl acetate copolymer (EVA), ethylene/alkyl(meth)acrylate copolymer (EMA), ethylene/vinyl alcohol copolymer, ethylene/(meth)acrylic acid copolymer, ethylene/butyl acrylate (EBA) copolymer, ethylene/acrylic acid (EAA), and ionomer;

(2) polyester such as, for example, polyethylene terephthalate (PET) or polyethylene naphthenate (PEN);

(3) polyvinyl chloride (PVC) or polyvinylidene dichloride (PVDC);

(4) polycaprolactone;

(5) amide polymer and copolymer;

(6) polycarbonate;
(7) polyurethane;
(8) polyether;
(9) propylene polymer and copolymer;
(10) styrene polymer and copolymer; and
(11) blends of the above.

Any of these diluent polymers can be additionally or alternatively included in layers of packaging material other than those layer or layers comprising the oxygen scavenger composition of the invention.

Selection of a particular diluent polymer(s) depends largely on the article to be manufactured and the end use thereof. For instance, certain polymers are known by the ordinarily skilled artisan to provide clarity, cleanliness, barrier properties, mechanical properties, and/or texture to the resultant article.

The oxygen scavenger composition may be combined with a transition metal compound, as an oxygen scavenger catalyst. The transition metal catalyst can be a salt, compound or complex, which includes a metal selected from the first, second, or third transition series of the Periodic Table, such as Rh, Ru, or one of the elements in the series of Sc to Zn (i.e., Sc, Ti, V, Cr, Mn, Fe, Co, Ni, Cu, and Zn). Suitable anions for such salts include, but are not limited to, chloride, acetate, oleate, stearate, palmitate, 2-ethylhexanoate, neodecanoate, and naphthenate. Representative salts include cobalt (II) 2-ethylhexanoate, cobalt oleate, and cobalt (II) neodecanoate. The metal salt also can be an ionomer, in which case a polymeric counter ion may be employed.

When used in forming a packaging material, the resultant oxygen scavenger composition can include only the above-described polymers and a transition metal catalyst. However, a photoinitiator can be added to further facilitate and control the initiation of oxygen scavenging properties. Adding a photoinitiator or a blend of photoinitiators to the oxygen scavenger composition can be beneficial where antioxidants have been added to prevent premature oxidation of the composition during processing and storage.

Suitable photoinitiators are known to those skilled in the art. See, e.g., PCT publication WO 97/07161, WO 97/44364, WO 98/51758, and WO 98/51759, the teachings of which are incorporated herein by reference in their entirety. Specific examples of suitable photoinitiators include, but are not limited to, benzophenone, and its derivatives, such as methoxybenzophenone, dimethoxybenzophenone, dimethylbenzophenone, diphenoxybenzophenone, allyloxybenzophenone, diallyloxybenzophenone, dodecyloxybenzophenone, dibenzosuberone, 4,4'-bis(4-isopropylphenoxy)benzophenone, 4-morpholinobenzophenone, 4-aminobenzophenone, tribenzoyl triphenylbenzene, tritoluoyl triphenylbenzene, 4,4'-bis(dimethylamino)-benzophenone, acetophenone and its derivatives, such as, o-methoxy-acetophenone, 4'-methoxyacetophenone, valerophenone, hexanophenone, a-phenylbutyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones; alpha-tetralone, 9-acetylphenanthrene, 2-acetylphenanthrene, 10-thioxanthenone, 3-acetyl-phenanthrene, 3-acetylindole, 9-fluorenone, 1-indanone, 1,3,5-triacetylbenzene, thioxanthen-9-one, isopropylthioxanthen-9-one, xanthene-9-one, 7-H-benz[de]anthracen-7-one, 1'-acetonaphthone, 2'-acetonaphthone, acetonaphthone, benz[a]anthracene-7,12-dione, 2,2-dimethoxy-2-phenylacetophenone, diethoxyacetophenone, dibutoxyacetophenone, 4-benzoyl-4'-methyl(diphenyl sulfide), 2,4,6-trimethylbenzoyldiphenylphosphine oxide, bis-(2,4,6-trimethylbenzoyl)phenylphosphine oxide (Irgacure 819), bis(2,6-dimethoxybenzoyl)-2,4,4-trimethylpentylphosphine oxide, and the like.

Photoinitiators generally provide faster and more efficient initiation than single oxygen-generating photosensitizers such as Rose Bengal, methylene blue, and tetraphenylporphine as well as polymeric initiators, such as poly(ethylene carbon monoxide) and oligo[2-hydroxy-2-methyl-1-[4-(1-methylvinyl)phenyl]propanone], although these materials can also be used.

When actinic radiation is used, photoinitiators also can provide initiation at longer wavelengths, which are less costly to generate and present less harmful side effects than shorter wavelengths. When the diluent resins are PET or PEN and the like, photoinitiators that absorb at longer wavelengths in order to allow adequate triggering are beneficial.

When a photoinitiator is included, it can enhance and/or facilitate the initiation of oxygen scavenging by the composition upon exposure to radiation. The amount of photoinitiator can depend on the amount of cyclic unsaturation present in the polymer, the wavelength and intensity of radiation used, the nature and amount of antioxidants used, and the type of photoinitiator used. The amount of photoinitiator also can depend on how the scavenging composition is used. For instance, if a photoinitiator-containing composition is in a film layer, which is underneath another layer that is somewhat opaque to the radiation used, more initiator might be needed. However, the amount of photoinitiator used for most applications ranges from 0.01 to 10% of the total composition. Oxygen scavenging can be initiated by exposing an article containing the composition of the present invention to actinic or electron beam radiation, as described below.

One or more known antioxidants can be incorporated into a scavenging composition that comprises a polymer product of the present invention. Such antioxidants retard degradation of the components during compounding and film formation. Although such additives prolong the induction period for oxygen scavenging activity to occur in the absence of irradiation, the layer or article (and any incorporated photoinitiator) can be exposed to radiation at the time oxygen scavenging properties are required. Suitable antioxidants include but are not limited to 2,6-di(t-butyl)-4-methylphenol (BHT), 2,2'-methylene-bis(6-t-butyl-p-cresol), tri-phenylphosphite, tris-(nonylphenyl) phosphite, dilaurylthiodipropionate, vitamin E (alpha-tocopherol), octadecyl-3,5-di-tert-butyl-4hydroxyhydrocinnamate, tetrakis[methylene(3,5-di-tert-butyl-4-hydroxyhydrocinnamate)]methane, tetrakis(2,4-di-tert-butylphenyl)-4,4'-biphenyldiphosphonite and the like.

When an antioxidant is included as part of the finished composition, it can be present in an amount sufficient to prevent oxidation of the components of the oxygen scavenging composition as well as other materials present in a resultant blend during formation and processing; but less than that which significantly interferes with the scavenging activity of the packaging material after initiation has occurred. The amount needed in a given composition can depend i.a. on the components present therein, the particular antioxidant used, the degree and amount of thermal processing used to form the shaped article, and the dosage and wavelength of radiation applied to initiate oxygen scavenging. Typically, such antioxidant(s) are used in an amount of from 0.01 to 1% by weight of the oxygen scavenger composition.

Other additives that also can be included in the oxygen scavenger composition include, but are not necessarily limited to, fillers, pigments, dyestuffs, processing aids, plasticizers, antifog agents, antiblocking agents, and the like.

The relative amounts of the components used in the oxygen scavenger composition can affect the use and effectiveness of this composition. Thus, the amounts of polymer, transition metal catalyst, and any photoinitiator, antioxidant, polymeric diluents, additives, etc., can vary depending on the desired article and its end use. For example, one of the primary functions of the polymer described above is to react irreversibly with oxygen during the scavenging process, while a primary function of the transition metal catalyst is to facilitate this process. Thus, to a large extent, the amount of polymer present affects the oxygen scavenging capacity of the composition, i.e., the amount of oxygen that the composition can consume, while the amount of transition metal catalyst affects the rate at which oxygen is consumed as well as the induction period.

The oxygen scavenger composition of the present invention can provide oxygen scavenging properties at a desirable rate and capacity while having good processing and compatibility properties. Thus, the composition can be used to provide, by itself or as a blend with diluent film-forming polymers, such as polyolefins and the like, a packaging material, such as a film that can be manufactured and processed easily. The oxygen scavenger composition will deplete the oxygen within a package cavity without giving off large amounts of low molecular weight materials. Further, the composition will deplete the oxygen within a package cavity without substantially detracting from the color, taste, and/or odor of the product contained therein. In addition, the composition has enhanced processability both in its formation as a packaging material and in its handling and processing to form a packaged article such as a laminated packaged article. Finally, the present oxygen scavenger composition has been found to provide enhanced scavenger properties when used under both ambient and refrigeration temperature conditions.

The amount of the oxygen scavenger composition present in a packaging material can be determined based on the desired end use, and can range from 1% to 100%, such as from 5 to 97.5%, 10 to 95%, 15 to 92.5%, and 20 to 90%, (with all of the foregoing percentages being by weight of the packaging material, or the relevant layer of the packaging material. Incorporation of low levels of the oxygen scavenger composition, e.g., 1 to 20% by weight, can be used for active barrier applications to prevent oxygen ingress into the container. Higher levels of the subject oxygen scavenger composition, e.g., 21 to 100% by weight, can be used for headspace oxygen scavenging applications where large quantities of oxygen are to be removed from the package.

Typically, the amount of transition metal catalyst to be used in conjunction with the oxygen scavenger composition can range from 0.001 to 1% by weight of the scavenging composition, based on the metal content only (i.e., excluding ligands, counter ions, etc.). Where one or more other scavenging compounds and/or diluent polymers are used as part of the composition, such other materials can make up as much as 99%, such as up to 75%, of the scavenger composition. Any further additives employed normally do not make up more than 10% by weight, such as no more than 5%, of the scavenger composition. As indicated above, the oxygen scavenger composition of the present invention can be used to produce a scavenging monolayer film, a scavenging layer of a multilayer film, or other articles for a variety of packaging applications. Single layer articles can be prepared readily by extrusion processing and provide a product having low tack properties. Such properties, as discussed above, provide enhanced processability in formation of a film with few or no defect, and like packaging articles, and further, in processing as part of the finished packaging article. Multilayer films typically are prepared using coextrusion, coating, lamination or extrusion/lamination as taught in, for example, U.S. Pat. Nos. 5,350,622 and 5,529,833, the teachings of which are incorporated herein by reference in their entirety.

At least one of the additional layers of a multilayer packaging material can include a barrier type material having a permeability to oxygen of no more than $5.8 \times 10^{-8}$ $cm^3/m^2$-s-Pa (i.e., 500 $cm^3/m^2$-24 hours-atm), such as no more than $1.06 \times 10^{-8}$ $cm^3/m^2$-s-Pa (i.e., 100 $cm^3/m^2$-24 hours-atm), such as no more than $0.58 \times 10^{-8}$ $cm^3/m^2$-s-Pa (i.e., 50 $cm^3/m^2$-24 hours-atm) at 25° C. Polymers, which are commonly used in such oxygen barrier layers, include poly(ethylene/vinyl alcohol)(EVOH), poly(vinyl alcohol) (PVOH), polyacrylonitrile (PAN), polyvinyl chloride (PVC), poly(vinylidene dichloride) (PVDC), polyethylene terephthalate (PET), silica ($SiO_x$), and polyamides such as polycaprolactam (nylon 6), metaxylylene adipamide (MXD6), hexamethylene adipamide (nylon 66), as well as various amide copolymers. Metal foil layers can also provide oxygen barrier properties. Other additional layers can include one or more layers which are permeable to oxygen.

In one preferred packaging construction, a flexible package for food, the layers of a film can include (in order starting from the outside of the package to the innermost layer of the package) (a) an oxygen barrier layer, (b) a scavenging layer, i.e. one that includes the scavenging composition described above, and optionally, (c) an oxygen permeable layer. Control of the oxygen barrier property of layer (a) provides a means to regulate the scavenging life of the package by limiting the rate of oxygen entry to the scavenging layer (b), thus limiting the rate of consumption of scavenging capacity. Control of the oxygen permeability of layer (c) provides a means to set an upper limit on the rate of oxygen scavenging for the overall structure independent of the composition of scavenging layer (b). This can serve the purpose of extending the handling lifetime of the film in the presence of air prior to sealing of the package. Furthermore, layer (c) can provide a barrier to migration of the individual components or byproducts of the scavenging layer into the package interior. The term "exposed to the interior" refers to a portion of a packaging article having a scavenging composition that comprises the oxygen scavenger composition which is either directly exposed or indirectly exposed (via layers which are $O_2$ permeable) to the interior cavity having oxygen sensitive product. Even further, layer (c) also can improve the heat sealability, clarity, and/or resistance to blocking of the multilayer film. Further additional layers such as tie layers, easy open layers, and seal layers can also be used. Polymers typically used in such tie layers include, for example, anhydride functional polyolefins.

The oxygen scavenger composition of the present invention can be used in a packaging material designed to allow exposure of the above-described composition to a package cavity having an oxygen sensitive product therein. One embodiment provides for including, in addition to the transition metal catalyst, antioxidants and a photoinitiator as part of the subject composition and subjecting a film, layer, or article that includes such a composition to actinic radiation so as to initiate oxygen scavenging on demand at desired rates. In this embodiment the thermal radiation used in heating and processing the polymers typically used in packaging films (e.g., 100 to 250° C.) advantageously does not trigger the oxygen scavenging reaction. However, there may exist applications in which triggering is not possible or desired. Therefore, if low amounts of antioxidant are used in the oxygen scavenger composition in conjunction with the catalyst, it is possible to prepare a composition which would become actively oxygen scavenging upon extrusion. These materials would need to be used immediately or in some way protected from oxygen during storage.

The initiating radiation is actinic, e.g., UV or visible light having a wavelength of from 200 to 750 nm, such as from 200 to 600 nm, and from 200 to 400 nm. Such light can be delivered in a continuous or pulsed manner. The layer, film, etc., containing the oxygen scavenger composition is exposed to such radiation until it receives at least 1 J/g of radiation, e.g. until it receives a dose in the range of 10 to 2000 J/g. The radiation also can be electron-beam radiation at a dosage of at least 2 kiloGray (kGy), such as from 10 to 100 kGy. Other potential sources of radiation include ionizing radiation such as gamma, X-ray, and corona discharge. Required duration of exposure depends on several factors including, but not limited to, the amount and type of photoinitiator present, thickness of the layers to be exposed, thickness and opacity of intervening layers, amount of any antioxidant present, and the wavelength and intensity of the radiation source.

When using oxygen scavenging layers or articles, irradiation can occur during or after the layer or article is prepared. If the resulting layer or article is to be used to package an oxygen sensitive product, exposure can be just prior to, during, or after packaging. For best uniformity of irradiation, exposure occurs at a processing stage where the layer or article is in the form of a flat sheet. For further information on initiation via irradiation, the reader is directed to PCT publications WO 98/05555 and WO 98/05703, as well as PCT 97/13598, 97/13370, 97/13369, the teachings of which are incorporated herein by reference.

Determining the oxygen scavenging rate and capacity of a given oxygen scavenger composition contemplated for a particular use can be beneficial. To determine the rate, the time elapsed before the scavenger depletes a certain amount of oxygen from a sealed container is measured. In some instances the rate can be determined adequately by placing a film containing the desired scavenging composition in an airtight, sealed container of an oxygen-containing atmosphere, e.g., air which typically contains 20.6% (by vol.) $O_2$ or some other quantity such as 1% (by vol.) $O_2$. Over time, samples of the atmosphere inside the container are removed to determine the percentage of oxygen remaining. Usually, the specific rates obtained vary under different temperature and atmospheric conditions. Atmospheres having lower initial oxygen content and/or maintained under low temperature conditions provide a more stringent test of the scavenging ability and rate of a composition. When an active oxygen barrier is needed, a useful scavenging rate can be as low as 0.05 cm$^3$ oxygen per gram of the polymer in the scavenging composition per day in air at 25° C. and at 1 atm (101.3 kPa). However, in most instances, compositions having the instant polymer product have a rate equal to or greater than $5.8 \times 10^{-6}$ cm$^3$/g.S (0.5 cm$^3$/g·day), e.g. greater than $5.8 \times 10^{-5}$ cm$^3$/g.S (5 cm$^3$/g·day). Further, films or layers including the oxygen scavenger composition t are capable of a scavenging rate greater than $1.2 \times 10^{-4}$ cm$^3$/m$^2$.S (10 cm$^3$/m$^2$·day),) and under some conditions, greater than $2.9 \times 10^{-4}$ cm$^3$/m$^2$.S (25 cm$^3$/m$^2$·day). Generally, films or layers generally deemed suitable for use as an active oxygen barrier can have a scavenging rate as low as $1.2 \times 10^{-5}$ cm$^3$/m$^2$.S (1 cm$^3$/m$^2$·day) when measured in air at 25° C. and 101 kPa (1 atm). Scavenging rates suitable for refrigeration temperature conditions are attained with the present composition. Such rates make those layers suitable for scavenging oxygen from within a package, as well as suitable for active oxygen barrier applications.

In one embodiment, when the oxygen scavenger composition of the present invention is to be used in an active oxygen barrier application, the initiated oxygen scavenging activity, in combination with any oxygen barriers, can create an overall oxygen permeance of less than $1.1 \times 10^{-10}$ cm$^3$/m$^2$·s·Pa (1.0 cm$^3$/m$^2$·day·atm) at 25° C., and the oxygen scavenging capacity is such that this value is not exceeded for at least two days.

Once scavenging has been initiated, the oxygen scavenger composition, or packaging material prepared therefrom, is in theory able to scavenge up to its capacity, i.e., the amount of oxygen which the scavenger is capable of consuming before it becomes ineffective. In actual use, the capacity required for a given application can depend on the quantity of oxygen initially present in the package, the rate of oxygen entry into the package in the absence of the scavenging property, and the intended shelf life for the package. When using the oxygen scavenger composition, the capacity can be as low as 1 cm$^3$/g, but can be 50 cm$^3$/g or higher. When the composition is in a layer of a film, the layer can have an oxygen capacity of at least 4.9 cm$^3$/m$^2$ per μm thickness (125 cm$^3$/m$^2$ per mil), such as at least 11.5 cm$^3$/m$^2$ per μm thickness (300 cm$^3$/m$^2$ per mil).

The oxygen scavenger composition has been found to be capable of providing a packaging material which substantially retains its physical properties (e.g., tensile strength and modulus) even after substantial oxygen scavenging has occurred. In addition, the oxygen scavenger composition does not provide significant amounts of byproducts and/or effluents, which can impart an undesired taste, color, and/or odor to the packaged product.

The following examples are given as specific illustrations of the claimed invention. It should be understood, however, that the invention is not limited to the specific details set forth in the examples. All parts and percentages in the examples, as well as in the remainder of this specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLE 1

Synthesis of Polyester Resin from cis-1,2,3,6-Tetrahydrophthalic Anhydride, 1,6-Hexanediol, 800 ppm TMOP and 10% Isophthalic Acid A 250 mL round bottom flask (RBF) was charged with 69.5 g of 1,6-hexanediol, 9.7 g isophthalic acid, 0.06 g trimethylolpropane, 0.04 g of Ti(IV)butoxide catalyst and 500 ppm (0.08 g) of IRGANOX™ 3114 stabilizer. The RBF was fitted with a vacuum line/nitrogen inlet, a thermowell, a magnetic stirring bar and a Dean-Stark trap fitted with an ice filled condenser. The reaction flask was flushed with nitrogen. The reaction mixture was heated with a heating mantle under vacuum at 135° C. until all materials were dissolved. At this point 80.0 g of cis-1,2,3,6-tetrahydrophthalic anhydride was added and heating at 135° C. continued under vacuum until all materials were melted, and then the reaction flask was flushed with nitrogen three times in order to remove dissolved oxygen. The vacuum was removed and the reaction vessel was maintained under a nitrogen atmosphere. The temperature was increased to initiate distillation, which was conducted at 210° C. for 1 hour, and then the temperature was increased to 230° C. for one hour. During this time 11.2 g of distillate was collected. The distillate was predominantly water, but also contained 9% 1,6-hexanediol.

In the second step, an additional 0.04-g of Ti(IV) butoxide was added to the mixture and the reaction mixture was heated to 240° C. under vacuum (0.2–0.6 mm Hg) distillation and held for 2.5 hours. At this point the reaction mixture was very viscous. The reaction mixture was discharged onto TEFLON™ film. The distillate collected in the second stage consisted of 2.8 g (1.9%) of crystalline material identified as oligomeric by-products. The polymer was a soft solid material. It could be handled without sticking, however, it exhibited some degree of cold flow. Data is summarized in Tables 1, 2 and 3.

EXAMPLE 2

Synthesis of Polyester Resin from cis-1,2,3,6-Tetrahydrophthalic Anhydride, 1,6-Hexanediol, 800 ppm TMOP and 10% Terephthalic Acid A 250 mL round bottom flask was charged with 69.5 g of 1,6-hexanediol, 9.7 g terephthalic acid, 0.06 g trimethylolpropane, 0.04 g of Ti(IV) butoxide catalyst and 500 ppm (0.08 g) of IRGANOX™ 3114 stabilizer. The RBF was fitted with a vacuum line/nitrogen inlet, a thermowell, a magnetic stirring bar and a Dean-Stark trap fitted with an ice filled condenser. The reaction flask was flushed with nitrogen. The reaction mixture was heated with a heating mantle under vacuum at 135° C. until all materials were dissolved, approximately one hour. At this point 80.0 g of cis-1,2,3,6-tetrahydrophthalic anhydride was added and heating at 135° C. continued under vacuum until all materials were melted, and then the reaction flask was flushed with nitrogen in order to remove dissolved oxygen. The vacuum was removed and the reaction vessel was maintained under a nitrogen atmosphere. The temperature was increased to initiate distillation, which was conducted at 210° C. for one hour, and then the temperature was increased to 230° C. for one hour. During this time 11.9 g of distillate was collected. The distillate was predominantly water, but also contained 7.2% 1,6-hexanediol.

In the second step, an additional 0.035 g of Ti(IV) butoxide was added to the mixture and the reaction mixture was heated to 240° C. under vacuum (0.2–0.6 mm Hg) distillation and held for 2.5 hours. At this point the reaction mixture was very viscous. The reaction mixture was discharged onto TEFLON™ film. The distillate collected in the second stage consisted of 3.6 g (2.4%) of crystalline material identified as oligomeric by-products. The polymer was a soft solid material. It could be handled without sticking, however, it exhibited some degree of cold flow. Data is summarized in Tables 1, 2 and 3.

EXAMPLE 3

Synthesis of Polyester Resin from cis-1,2,3,6-Tetrahydrophthalic Anhydride, 1,6-Hexanediol, 800 ppm TMOP and 10% Dimethyl Terephthalate A 250 mL round bottom flask was charged with 69.6 g of 1,6-hexanediol, 11.3 g dimethylterephthalate, 0.06 g trimethylolpropane, 0.04 g of Ti(IV) butoxide catalyst and 500 ppm (0.08 g) of IRGANOX™ 3114 stabilizer. The RBF was fitted with a vacuum line/nitrogen inlet, a thermowell, a magnetic stirring bar and a Dean-Stark trap fitted with an ice filled condenser. The reaction flask was flushed with nitrogen. The reaction mixture was heated with a heating mantle under vacuum at 100° C. until all materials were dissolved, approximately one hour. At this point 80.0 g of cis-1,2,3,6-tetrahydrophthalic anhydride was added and heating continued under vacuum until all materials were melted, and then the reaction flask was flushed with nitrogen in order to remove dissolved oxygen. The vacuum was removed and the reaction vessel was maintained under a nitrogen atmosphere. The temperature was increased to initiate distillation, which was conducted at 210° C. for one hour, and then the temperature was increased to 230° C. for one hour. During this time 11.1 g of distillate was collected. The distillate was predominantly water, but also contained some 1,6-hexanediol.

In the second step, an additional 0.04 g of Ti (IV) butoxide was added and the reaction mixture was heated to 240° C. under vacuum (0.2–0.6 mm Hg) distillation and held for 2 hours. At this point the reaction mixture was very viscous. The reaction mixture was discharged onto TEFLON™ film. The distillate collected in the second stage consisted of 7.2 g (4.8%) of crystalline material identified as oligomeric by-products. The polymer was a soft solid material. It could be handled without sticking, however, it exhibited some degree of cold flow. Data is summarized in Tables 1, 2 and 3.

EXAMPLE 4

Synthesis of Polyester Resin from cis-1,2,3,6-Tetrahydrophthalic Anhydride, Ethylene Glycol, 800 ppm TMOP and 10% Isophthalic acid A 250 mL round bottom flask was charged with 50.25 g of ethylene glycol, 13.3 g isophthalic acid, 0.09 g trimethylolpropane, 0.045 g of Ti(IV)butoxide catalyst and 500 ppm (0.09 g) of IRGANOX™ 3114 stabilizer. The RBF was fitted with a vacuum line/nitrogen inlet, a thermowell, a magnetic stirring bar and a Dean-Stark trap fitted with an ice filled condenser. The reaction flask was flushed with nitrogen. The reaction mixture was heated with a heating mantle under vacuum until all materials were dissolved, approximately one hour. At this point 110 g of cis-1,2,3,6-tetrahydrophthalic anhydride was added to the mixture and heating continued under vacuum until all materials were melted, and then the reaction flask was flushed with nitrogen in order to remove dissolved oxygen. The vacuum was removed and the reaction vessel was maintained under a nitrogen atmosphere. The temperature was increased to initiate distillation, which was conducted at 185° C. for one hour, 200° C. for one hour, 210° C. for 30 minutes and then the temperature was increased to 230° C. for 30 minutes. During this time 12.6 g of distillate was collected. The distillate was predominantly water, but also contained some ethylene glycol.

In the second step, an additional 0.04 g of Ti(IV) butoxide was added and the reaction mixture was heated to 240° C. under vacuum (0.2–0.6 mm Hg) distillation and held for 1.5 hours. The reaction mixture was discharged onto TEFLON™ film. The distillate collected in the second stage consisted of 5.7 g (3.5%) of crystalline material identified as oligomeric by-products. The polymer was a crystalline, solid material. it could be handled without sticking, however, it exhibited some degree of cold flow. Data is summarized in Tables 1, 2 and 3.

EXAMPLE 5

Synthesis of Polyester Resin from cis-1,2,3,6-Tetrahydrophthalic Anhydride, 1,4-Butanediol, 800 ppm TMOP and 10% Terephthalic Acid A 250 ml round bottom flask was charged with 66.3 g of 1,4-butanediol, 12.1 g terephthalic acid, 0.08 g trimethylolpropane, 0.045 g of Ti(IV)butoxide catalyst and 500 ppm (0.09 g) of IRGANOX™ 3114 stabilizer. The RBF was fitted with a vacuum line/nitrogen inlet, a thermowell, a magnetic stirring bar and a Dean-Stark trap fitted with an ice filled condenser. The reaction flask was flushed with nitrogen. The reaction mixture was heated with a heating mantle under vacuum at 145° C. until all materials were dissolved, approximately one hour. At this point 100.0 g of cis-1,2,3,6-tetrahydrophthalic anhydride was added and heating at 145° C. continued under vacuum until all materials were melted, and then the reaction flask was flushed with nitrogen in order to remove dissolved oxygen. The vacuum was removed and the reaction vessel was maintained under a nitrogen atmosphere. The temperature was increased to initiate distillation, which was conducted at 210° C. for one hour, and then the temperature was increased to 230° C. for one hour. During this time 16.2 g of distillate was collected. The distillate was predominantly water, but also contained 5% 1,4-butanediol and 1% tetrahydrofuran (THF).

In the second step, an additional 0.045 g of Ti(IV) butoxide was added and the reaction mixture was heated to 240° C. under vacuum (0.2–0.6 mm Hg) distillation and held for 1.5 hours. At this point the reaction mixture was very viscous. The reaction mixture was discharged onto TEFLON™ film. The distillate collected in the second stage consisted of 12.8 g (7.5%) of crystalline material identified as oligomeric by-products. The polymer was a soft solid material. It could be handled without sticking. Data is summarized in Tables 1, 2 and 3.

EXAMPLE 6

Synthesis of Polyester Resin from cis-1,2,3,6-Tetrahydrophthalic Anhydride, 1,8-Octanediol, 800 ppm TMOP and 10% isophthalic Acid A 250 mL round bottom flask was charged with 86 g of 1,8-octanediol, 9.7 g isophthalic acid, 0.06 g trimethylolpropane, 0.045 g of Ti(IV) butoxide catalyst and 500 ppm (0.08 g) of IRGANOX™ 3114 stabilizer. The RBF was fitted with a vacuum line/nitrogen inlet, a thermowell, a magnetic stirring bar and a Dean-Stark trap fitted with an ice filled condenser. The reaction flask was flushed with nitrogen. The reaction mixture was heated with a heating mantle under vacuum at 145° C. until all materials were dissolved. At this point 80.0 g of cis-1,2,3,6-tetrahydrophthalic anhydride was added and heating at 145° C. continued under vacuum until all materials were melted, and then the reaction flask was flushed with nitrogen three times in order to remove dissolved oxygen. The vacuum was removed and the reaction vessel was maintained under a nitrogen atmosphere. The temperature was increased to initiate distillation, which was conducted at 210° C. for one hour, and then the temperature was increased to 230° C. for one hour. During this time 10.5 g of distillate was collected. The distillate was predominantly water.

In the second step, an additional 0.045 g of Ti(IV) butoxide was added to the mixture and the reaction mixture was heated to 240° C. under vacuum (0.2–0.6 mm Hg) distillation and held for 2 hours. The reaction mixture was discharged onto TEFLON™ film. The distillate collected in the second stage consisted of 3.6 g (2.2%) of crystalline material identified as oligomeric by-products. Data is summarized in Tables 1, 2 and 3.

EXAMPLE 7

Synthesis of Polyester Resin from cis-1,2,3,6-Tetrahydrophthalic Anhydride, 1,10-Decanediol, 800 ppm TMOP and 10% Isophthalic Acid A 250 mL round bottom flask was charged with 102.6 g of 1,10-decanediol, 9.7 g isophthalic acid, 0.06 g trimethylolpropane, 0.05 g of Ti(IV) butoxide catalyst and 500 ppm (0.10 g) of IRGANOX™ 3114 stabilizer. The RBF was fitted with a vacuum line/nitrogen inlet, a thermowell, a magnetic stirring bar and a Dean-Stark trap fitted with an ice filled condenser. The reaction flask was flushed with nitrogen. The reaction mixture was heated with a heating mantle under vacuum at 145° C. until all materials were dissolved. At this point 80.0 g of cis-1,2,3,6-tetrahydrophthalic anhydride was added and heating at 145° C. continued under vacuum until all materials were melted, and then the reaction flask was flushed with nitrogen three times in order to remove dissolved oxygen. The vacuum was removed and the reaction vessel was maintained under a nitrogen atmosphere. The temperature was increased to initiate distillation, which was conducted at 210° C. for one hour, and then the temperature was increased to 230° C. for one hour. During this time 8.6 g of distillate was collected. The distillate was predominantly water.

In the second step, an additional 0.05 g of Ti(IV) butoxide was added to the mixture and the reaction mixture was heated to 240° C. under vacuum (0.2–0.6 mm Hg) distillation and held for two hours. The reaction mixture was discharged onto TEFLON™ film. The distillate collected in the second stage consisted of 6.8 g (3.7%) of crystalline material identified as oligomeric by-products. Data is summarized in Tables 1, 2 and 3.

COMPARATIVE EXAMPLE 1

Synthesis of Polyester Resin from cis-1,2,3,6-Tetrahydrophthalic Anhydride and 1,6-Hexanediol The polyester of this comparative example was formed with only components representative of monomers (A) and (B). The product formed contained large amounts of oligomer material when compared to Examples 1 and 2.

A 250 mL round bottom flask was charged with 62.6 g of 1,6-hexanediol, 80.0 g of cis-1,2,3,6-tetrahydrophthalic anhydride, 0.035 g of Ti (IV)butoxide catalyst and 500 ppm (0.07 g) of IRGANOX™ 3114 stabilizer. This is a 1.008 mole ratio of diol to anhydride. The RBF was fitted with a vacuum line/nitrogen inlet, a thermowell, a magnetic stirring bar and a Dean-Stark trap fitted with an ice filled condenser. The reaction mixture was heated with a heating mantle under vacuum until all materials were melted, (approximately 135° C.) and then flushed with nitrogen in order to remove dissolved oxygen. The vacuum was removed and the reaction vessel was maintained under a nitrogen atmosphere. The temperature was increased to initiate distillation, which was conducted at 210° C. for one hour, and then the temperature was increased to 230° C. for one hour. During this time 9.4 g of distillate was collected. The distillate was predominantly water, but also contained 11.3% 1,6-hexanediol.

In the second step, an additional 0.035 g of Ti(IV) butoxide was added to the mixture and the reaction mixture was heated to 240° C. under vacuum (0.2–0.6 mm Hg) distillation and held for 2.5 hours. At this point the reaction mixture was very viscous. The reaction mixture was discharged onto TEFLON™ film. The distillate collected in the second stage consisted of 9.0 g (6.7%) of crystalline material identified as oligomeric by-products. The polymer was extremely sticky and difficult to handle. It was a high viscosity liquid and exhibited strong cold flow properties. Data is summarized in Tables 1, 2 and 3.

COMPARATIVE EXAMPLE 2

Synthesis of Polyester Resin from cis-1,2,3,6-Tetrahydrophthalic Anhydride, 1,6-Hexanediol and 800 ppm TMOP The polyester of this comparative example was formed with only components representative of monomers (A), (B) and (C). The product formed contained large amounts of oligomer material when compared to Examples 1 and 2.

A 250 mL round bottom flask was charged with 62.7 g of 1,6-hexanediol, 80.0 g of cis-1,2,3,6-tetrahydrophthalic anhydride, 0.056 g trimethylolpropane, 0.035 g of Ti (IV) butoxide catalyst and 500 ppm (0.07 g) of IRGANOX™ 3114 stabilizer. This is a 1.008 mole ratio of diol to anhydride. The RBF was fitted with a vacuum line/nitrogen inlet, a thermowell, a magnetic stirring bar and a Dean-Stark trap fitted with an ice filled condenser. The reaction mixture was heated with a heating mantle under vacuum until all materials were melted, (approximately 135° C.) and then flushed with nitrogen in order to remove dissolved oxygen. The vacuum was removed and the reaction vessel was maintained under a nitrogen atmosphere. The temperature was increased to initiate distillation, which was conducted at 210° C. for one hour, and then the temperature was increased to 230° C. for one hour. During this time 10.3 g of distillate was collected. The distillate was predominantly water, but also contained 10.7% 1,6-hexanediol.

In the second step, an additional 0.035 g of Ti(IV) butoxide was added to the mixture and the reaction mixture was heated to 240° C. under vacuum (0.2–0.6 mm Hg) distillation and held for 2.5 hours. At this point the reaction mixture was very viscous. The reaction mixture was discharged onto TEFLON™ film. The distillate collected in the second stage consisted of 8.9 g (6.7%) of crystalline material identified as oligomeric by-products. The polymer was a soft solid material. It could be handled without sticking, however, it exhibited some degree of cold flow. Data is summarized in Tables 1, 2 and 3.

COMPARATIVE EXAMPLE 3

Synthesis of Polyester Resin from cis-1,2,3,6-Tetrahydrophthalic Anhydride, 1,4-Butanediol and 800 ppm TMOP The polyester of this comparative example was formed with only components representative of monomers (A), (B) and (C). The polymer product formed contained large amounts of oligomer material when compared to Example 4.

A 250 mL round bottom flask was charged with 59.7 g of 1,4-butanediol, 100.0 g of cis-1,2,3,6-tetrahydrophthalic anhydride, 0.07 g trimethylolpropane, 0.04 g of Ti(IV) butoxide catalyst and 500 ppm (0.08 g) of IRGANOX™ 3114 stabilizer. This is a 1.008 mole ratio of diol to anhydride. The RBF was fitted with a vacuum line/nitrogen inlet, a thermowell, a magnetic stirring bar and a Dean-Stark trap fitted with an ice filled condenser. The reaction mixture was heated with a heating mantle under vacuum until all materials were melted, (approximately 135° C.) and then flushed with nitrogen in order to remove dissolved oxygen. The vacuum was removed and the reaction vessel was maintained under a nitrogen atmosphere. The temperature was increased to initiate distillation, which was conducted at 210° C. for one hour, and then the temperature was increased to 230° C. for one hour. During this time 12.0 g of distillate was collected. The distillate was predominantly water, but also contained 5% 1,4-butanediol and 1% THF.

In the second step, an additional 0.04 g of Ti(IV) butoxide was added to the mixture and the reaction mixture was heated to 240° C. under vacuum (0.2–0.6 mm Hg) distillation and held for 1.5 hours. At this point the reaction mixture was very viscous. The reaction mixture was discharged onto TEFLON™ film. The distillate collected in the second stage consisted of 19.2 g (13%) of crystalline material identified as oligomeric by-products. The polymer was a soft solid material. It could be handled without sticking, however, it exhibited some degree of cold flow. Data is summarized in Tables 1, 2 and 3.

COMPARATIVE EXAMPLE 4

Synthesis of Polyester Resin from cis-1,2,3,6-Tetrahydrophthalic Anhydride, 1,8-Octanediol and 800 ppm TMOP The polyester of this comparative example was formed with only components representative of monomers (A), (B) and (C). The polymer product formed contained larger amounts of oligomer material when compared to Example 5.

A polyester polymer was formed under the procedure of Comparative Example 2 except that the 1,6-hexanediol was replaced by 1,8-octanediol. Composition and synthesis details are given in Table 1. Molecular Weight and $T_g$ are reported in Table 2.

COMPARATIVE EXAMPLE 5

Synthesis of Polyester Resin from cis-1,2,3,6-Tetrahydrophthalic Anhydride, Ethylene Glycol and 800 ppm TMOP The polyester of this comparative example was formed with only components representative of monomers (A), (B) and (C). The polymer product formed contained large amounts of oligomer material when compared to Example 4.

A polyester polymer was formed under the procedure of Example 4 except that the isophthalic acid was omitted. Composition and synthesis details are given in Table 1. Molecular Weight and $T_g$ are reported in Table 2.

COMPARATIVE EXAMPLE 6

Synthesis of Polyester Resin from cis-1,2,3,6-Tetrahydrophthalic Anhydride, 1,10-Decanediol and 800 ppm TMOP The polyester of this comparative example was formed with only components representative of monomers (A), (B) and (C). The polymer product formed contained larger amounts of oligomer material when compared to Example 6. A polyester polymer was formed under the procedure of Example 6 except that the isophthalic acid was omitted. Composition and synthesis details are given in Table 1. Molecular Weight and $T_g$ are reported in Table 2.

TABLE 1

Polyester Compositions and Synthesis Results

| Ex. | Diol Monomer (B) | Diol (B) (g) | THPA (A) (g) | TMOP (C) (g) | Monomer (D) (g) | Stage 1 Distillate (g) | Vac. Distillate (g) | % Oligomer Distillate % |
|---|---|---|---|---|---|---|---|---|
| 1 | 1,6-hexanediol | 69.5 | 80 | 0.06 | 9.7 | 11.2 | 2.8 | 1.9 |
| 2 | 1,6-hexanediol | 69.5 | 80 | 0.06 | 9.7 | 11.9 | 3.6 | 2.4 |
| 3 | 1,6-hexanediol | 69.6 | 80 | 0.06 | 11.3 | 11.1 | 7.2 | 4.8 |
| 4 | ethylene glycol | 50.3 | 110 | 0.09 | 13.3 | 12.6 | 5.7 | 3.5 |
| 5 | 1,4-butanediol | 66.3 | 100 | 0.08 | 12.1 | 16.2 | 12.8 | 7.5 |
| 6 | 1,8-octanediol | 86 | 80 | 0.06 | 9.7 | 10.5 | 3.6 | 2.2 |
| 7 | 1,10-decanediol | 102.6 | 80 | 0.06 | 9.7 | 8.6 | 6.8 | 3.7 |
| 1C | 1,6-hexanediol | 62.6 | 80 | 0 | 0 | 9.4 | 9.0 | 6.7 |
| 2C | 1,6-hexanediol | 62.7 | 80 | 0.06 | 0 | 10.3 | 8.9 | 6.7 |
| 3C | 1,4-butanediol | 59.7 | 100 | 0.07 | 0 | 12.0 | 19.2 | 13 |
| 4C | 1,8-octanediol | 77.5 | 80 | 0.06 | 0 | 8.0 | 4.0 | 2.7 |
| 5C | ethylene glycol | 32.9 | 80 | 0.06 | 0 | 8.7 | 7.2 | 7.0 |
| 6C | 1,10-decanediol | 92.4 | 80 | 0.06 | 0 | 7.3 | 7.6 | 4.6 |

TABLE 2

Polyester Molecular Weight

| EX. # | | Molecular Weight (Final) | | | $T_g$ |
|---|---|---|---|---|---|
| | | Mn | Mw | Mw/Mn | ° C. |
| 1 | 1,6-hexanediol | 12,645 | 52,316 | 4.1 | −28 |
| 2 | 1,6-hexanediol | 11,899 | 42,883 | 3.6 | −27 |
| 3 | 1,6-hexanediol | 11,666 | 38,441 | 3.3 | −28 |
| 4 | ethylene glycol | 6,865 | 18,495 | 2.3 | 16.2 |
| 5 | 1,4-butanediol | 10,758 | 41,340 | 3.8 | −10.2 |
| 6 | 1,8-octanediol | 12,895 | 37,224 | 2.9 | −36.1 |
| 7 | 1,10-decanediol | 8,213 | 20,361 | 2.5 | −45.6 |
| 1C | 1,6-hexanediol | 12,501 | 62,288 | 5.0 | −29 |
| 2C | 1,6-hexanediol | 12,397 | 66,190 | 5.3 | −30 |
| 3C | 1,4-butanediol | 10,277 | 47,836 | 4.7 | −13.9 |
| 4C | 1,8-octanediol | 11,000 | 45,000 | 4.1 | −46.5 |
| 5C | ethylene glycol | 10,600 | 132,000 | 12.5 | 15.1 |
| 6C | 1,10-decanediol | 8,800 | 27,400 | 3.1 | −53.3 |

Oxygen Scavenging Analysis

In order to test the oxygen scavenging properties of several of the prepared polyesters, each material was first blended with a polyethylene base resin in a 30:70 ratio and films of the resultant composition were prepared. In the laboratory a quick process was developed for testing using 35,000 molecular weight polyethylene (Aldrich 42,779-9). 25 g of polyester material was placed into a 12 ounce glass jar with 3000 ppm (0.075 g) of PEPQ™ (tetrakis(2,4-di-tert-butylphenyl)-4,4'-biphenyldiphosphonite), and 500 ppm (0.0125 g) of Vitamin E, and heated to melting in a 180° C. oil bath. In a second jar was placed the Aldrich polyethylene, which was also heated to melting in the oil bath. When both materials melted, 58.3 g of the melted polyethylene was added to the jar of melted polyester and the two materials vigorously stirred together. This gave 30% polyester and 70% polyethylene by weight. To this mixture was added 1000 ppm (0.08 g) of 4,4-dimethylbenzophenone (Lancaster Synthesis) and 1000 ppm (0.37 g) of cobalt neodecanoate (Co TENCEM™, OMG Inc., 22.5% Co). After mixing well the material was poured out onto a TEFLON™ sheet and allowed to cool to room temperature. The sheet was cut into approx. 1 inch squares and pressed into film between TEFLON™ sheets on a Carver press at its lowest temperature setting of "1" at 140° C.

The pressed monolayer scavenging film was cut into a 10 cm×10 cm piece, exposed to UV-C radiation for 90 seconds on an Anderson-Vreeland ultraviolet exposure unit and the film was then placed into a 16 cm×24 cm pouch prepared from Cryovac P640B™ barrier film and heat-sealed under vacuum. 300 cc of air was then introduced via septa. The oxygen content of each pouch was measured at regular intervals thereafter by withdrawing 8 cc samples of the atmosphere in the pouches via gas tight syringe and injecting into a MOCON® Model PACCHECK™ 650. Samples were stored at either room temperature conditions or in a refrigerator at 4° C. Samples were also tested without irradiation to measure storage stability. Data is reported in Table 3 below.

TABLE 3

Oxygen Scavenging of Prepared Polyesters Monolayer Films

Oxygen Scavenging Results

| | 20.6% $O_2$/Room Temperature | | | 1% $O_2$/Refrigerated | | |
|---|---|---|---|---|---|---|
| Ex # | 1 Day Rate (cc/m² · day) | 4 Day Rate (cc/m² · day) | Capacity 14 Days (cc $O_2$/g) | 1 Day Rate (cc/m² · day) | 4 Day Rate (cc/m² · day) | Capacity 14 Days (cc $O_2$/g) |
| 1 | 987 | 396 | 120 | 70 | 33 | 9 |

TABLE 3-continued

Oxygen Scavenging of Prepared Polyesters Monolayer Films

| | Oxygen Scavenging Results | | | | | |
|---|---|---|---|---|---|---|
| | 20.6% $O_2$/Room Temperature | | | 1% $O_2$/Refrigerated | | |
| Ex # | 1 Day Rate (cc/m$^2$ · day) | 4 Day Rate (cc/m$^2$ · day) | Capacity 14 Days (cc $O_2$/g) | 1 Day Rate (cc/m$^2$ · day) | 4 Day Rate (cc/m$^2$ · day) | Capacity 14 Days (cc $O_2$/g) |
| 2 | 779 | 351 | 107 | 58 | 29 | 6 |
| 4 | 850 | 342 | 102 | 25 | 26 | 4 |
| 1C | 805 | 396 | 131 | 56 | 32 | 9 |
| 2C | 835 | 354 | 132 | 74 | 34 | 11 |
| 3C | 971 | 407 | 122 | 65 | 31 | 8 |

The invention claimed is:

1. A film comprising at least one layer, the layer comprising an oxygen scavenger composition comprising a condensation polymer and an oxygen scavenging catalytic amount of a transition metal salt, compound or complex, wherein said polymer comprises mer units derived from:

(A) at least one or a mixture of substituted alicyclic compounds having non-aromatic, ethylenic functionality according to the following representation:

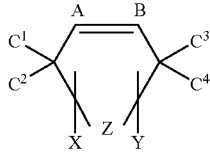

wherein

A, B, C$^1$, C$^2$, C$^3$, C$^4$ each independently represents hydrogen or a C$_q$H$_{2q+1}$ hydrocarbyl group with q being an integer of from 0 to 20, provided that either A or B and at least one of C$^1$, C$^2$, C$^3$, C$^4$ are hydrogen atoms and each carbon atom of the alicyclic ring is fully substituted by hydrogen, hydrocarbyl, X and/or Y group(s) or mixtures thereof to fill its valence state;

X and Y each independently represents —(CH$_2$)$_n$—C=O)-D with n being an integer in the range from 0 to 20 and D being selected from a halide atom or an OR group wherein R is hydrogen atom or a C$_1$–C$_{12}$ alkyl group, or X and Y together represent —(CH$_2$)$_n$—C=O)$_x$-D with x being 2, n being an integer in the range from 0 to 20 and D is oxygen atom; and Z representing a —(C$_t$H$_{2t}$)-hydrocarbylene group with t being an integer in the range from 1–4;

(B) at least one or a mixture of difunctional hydrocarbon compounds according to the following representation:

G-R'-G wherein

R' represents a C$_5$ or greater hydrocarbon group selected from alkylene, cycloalkylene or arylene group, and each G represents a hydroxyl or an amino group;

(C) from 300 to 15,000 parts per million based on the total of (A), (B), (C) and (D) of at least one or a mixture of polyfunctional hydrocarbon compounds according to the following representation:

J-R"(-J)$_z$ wherein

R" represents a C$_2$–C$_{20}$ hydrocarbon group selected from alkylene, cycloalkylene, arylene, alkarylene or aralkylene groups or mixtures thereof;

J represents a functional group selected from —OH, —NH$_2$, —N=C=O and —(CH$_2$)$_n$—C=O)-D with n being an integer in the range from 0 to 20 and D being selected from a halide atom or an OR'" group, wherein R'" is an —H, or C$_1$–C$_{12}$ alkyl group, or two J groups together represents —(CH$_2$)$_n$—C=O)$_x$-D with n being an integer of from 0 to 20, D being an oxygen atom and x being 2;

z is an integer of from 2 to 5; and (D) from 1 to 20 mole percent of the total of (A), (B), (C) and (D) of at least one or a mixture of monomer compounds selected from isophthalic acid, terephthalic acid, tetrahydroisophthalic acid, tetrahydroterephthalic acid, hydrogenated isophthalic acid, hydrogenated terephthalic acid, C$_1$–C$_{12}$ alkyl esters thereof, anhydride derivatives thereof, and hydrocarbyl derivatives thereof and lower C$_1$–C$_5$ glycol ester derivatives thereof; said X and Y of (A), G of (B) J of (C) and functional groups of (D) are in amounts that provide a molar ratio of carboxylic acid, acid ester, acid halide and isocyano groups to hydroxyl and amino groups of from 0.9 to 1.1:1.

2. The film of claim 1 wherein monomer (A) is selected from cis-1,2,3,6-tetrahydrophthalic anhydride; and dimethyl-1,2,3,6-tetrahydrophthalate.

3. The film of claim 1 wherein monomer (B) is selected from 1,5-pentanediol, 1,6-hexanediol, 1,7-heptanediol, 1,8-octanediol and mixtures thereof.

4. The film of claim 1 wherein the monomer (C) is selected from benzenepentacarboxylic acid, benzenehexacarboxylic acid, trimellitic anhydride, pyromellitic dianhydride, trimethylolpropane, pentaerythritol and mixtures thereof.

5. The film of claim 1 wherein monomer (D) is selected from isophthalic acid, terephthalic acid, isophthalic acid (C$_1$–C$_3$) alkyl ester, terephthalic acid (C$_1$–C$_3$) alkyl ester, bis(2-hydroxyethyl)terephthalate, bis(2-hydroxyethyl)isophthalate, hydrocarbyl substituted derivatives thereof and mixtures thereof.

6. A laminated product comprising a plurality of layers, including i) at least one layer, the layer comprising an oxygen scavenger composition comprising a condensation polymer and an oxygen scavenging catalytic amount of a transition metal salt, compound or complex, wherein said polymer comprises mer units derived from
(A) at least one or a mixture of substituted alicyclic compounds having non-aromatic, ethylenic functionality according to the following representation:

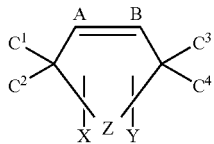

wherein
- A, B, $C^1$, $C^3$, $C^4$ each independently represents hydrogen or a $C_qH_{2q+1}$ hydrocarbyl group with q being an integer of from 0 to 20, provided that either A or B and at least one of $C^1$, $C^2$, $C^3$, $C^4$ are hydrogen atoms and each carbon atom of the alicyclic ring is fully substituted by hydrogen. hydrocarbyl. X and/or Y group(s) or mixtures thereof to fill its valence state;
- X and Y each independently represents —$(CH_2)_n$—C—O)—D with n being an integer in the range from 0 to 20 and D being selected from a halide atom or an OR group wherein R is hydrogen atom or a $C_1$–$C_{12}$ alkyl group, or X and Y together represent —$(CH_2)_n$—C—O$)_x$—D with x being 2, n being an integer in the range from 0 to 20 and D ia oxygen atom; and
- Z representing a —$(C_tH_{2t})$— hydrocarbylene group with t being an integer in the range from 1–4;
(B) at least one or a mixture of difunctional hydrocarbon compounds according to the following representation:

G-R'-G wherein
- R' represents a $C_5$ or greater hydrocarbon group selected from alkylene, cycloalkylene or arylene group, and
- each G represents a hydroxyl or an amino group;
ii) at least one layer comprising a material selected from the group consisting of
  a) a polymeric article,
  b) a paper article, and
  c) a metal article.

7. The laminated product of claim 6 wherein monomer (A) is selected from cis-1,2,3,6-tetrahydrophthalic anhydride; and dimethyl- 1,2,3,6-tetrahydrophthalate.

8. The laminated product of claim 6 wherein monomer (B) is selected from 1,5-pentanediol, 1,6-hexanediol, 1,7-heptanediol, 1,8- octanediol and mixtures thereof.

9. The laminated product of claim 6 wherein the monomer (C) is selected from benzenepentacarboxyliC acid, benzenehexacarboxylic acid, trimellitic anhydride, pyromellitic dianhydride, trimethylolpropane, pentaerythritol and mixtures thereof.

10. The laminated product of claim 6 wherein monomer (D) is selected from isophthalic acid, terephthalic acid, isophthalic acid ($C_1$-$C_3$) alkyl ester, terephthalic acid ($C_1$-$C_3$) alkyl ester, bis(2- hydroxyethyl)terephthalic, bis(2-hydroxyethyl)isophthalate, hydrocarbyl substituted derivatives thereof and mixtures thereof.

11. The laminated product of claim 6 wherein the polymeric article comprises a bottle.

12. The laminated product of claim 6 wherein the polymeric article comprises a tray.

13. The laminated product of claim 6 wherein the paper article comprises a gable top carton.

14. The laminated product of claim 6 wherein the metal article comprises a can.

* * * * *

UNITED STATES PATENT AND TRADEMARK OFFICE
CERTIFICATE OF CORRECTION

PATENT NO. : 7,078,100 B2
APPLICATION NO. : 10/649703
DATED : July 18, 2006
INVENTOR(S) : Ebner et al.

It is certified that error appears in the above-identified patent and that said Letters Patent is hereby corrected as shown below:

Column 26, Line 47, "from 0.9 to 1.1:1." should be -- from 0.9:1 to 1.1:1.--
Column 27, Line 19, "A, B, $C^1$, $C^3$, $C^4$" should be -- A, B, $C^1$, $C^2$, $C^3$, $C^4$ --
Column 27, Line 24, "hydrogen. hydrocarbyl. X" should be --hydrogen, hydrocarbyl, X--
Column 27, Line 26, "-$(CH_2)_n$ –C-O)-D" should be -- -$(CH_2)_n$-C=O)-D --
Column 27, Line 30, "-$(CH_2)_n$ –C-O)$_x$-D" should be -- -$(CH_2)_n$-C=O)$_x$-D --
Column 27, Line 32, "D ia oxygen atom" should be --D is an oxygen atom --
Column 28, Line 4, after "an amino group; insert -- (C) from 300 to 15,000 parts per million based on the total of (A), (B), (C) and (D) of at least one or a mixture of polyfunctional hydrocarbon compounds according to the following representation:

$$J-R''(-J)_z$$

wherein R" represents a $C_2$-$C_{20}$ hydrocarbon group selected from alkylene, cycloalkylene, arylene, alkarylene or aralkylene groups or mixtures thereof;
J represents a functional group selected from -OH, -$NH_2$, -N=C=O and -$(CH_2)_n$-C=O)-D with n being an integer in the range from 0 to 20 and D being selected from a halide atom or an OR'" group, wherein R'" is an -H, or $C_1$-$C_{12}$ alkyl group, or two J groups together represents -$(CH_2)_n$-C=O)$_x$-D with n being an integer of from 0 to 20, D being an oxygen atom and x being 2;
z is an integer of from 2 to 5; and (D) from 1 to 20 mole percent of the total of (A), (B), (C) and (D) of at least one or a mixture of monomer compounds selected from isophthalic acid, terephthalic acid, tetrahydroisophthalic acid, tetrahydroterephthalic acid, hydrogenated isophthalic acid, hydrogenated terephthalic acid, $C_1$-$C_{12}$ alkyl esters thereof, anhydride derivatives thereof, and hydrocarbyl derivatives thereof and lower $C_1$-$C_5$ glycol ester derivatives thereof, said X and Y of (A), G of (B), J of (C) and functional groups of (D) are in amounts that provide a molar ratio of carboxylic acid, acid ester acid halide and isocyano groups to hydroxyl and amino groups of from 0.9:1 to 1.1:1; and --

UNITED STATES PATENT AND TRADEMARK OFFICE
CERTIFICATE OF CORRECTION

PATENT NO. : 7,078,100 B2
APPLICATION NO. : 10/649703
DATED : July 18, 2006
INVENTOR(S) : Ebner et al.

It is certified that error appears in the above-identified patent and that said Letters Patent is hereby corrected as shown below:

Column 28, Line 18, "benzenepentacarboxyliC acid" should be
--benzenepentacarboxylic acid"--

Signed and Sealed this

Twenty-sixth Day of June, 2007

JON W. DUDAS
*Director of the United States Patent and Trademark Office*